US005276469A

United States Patent [19]

[11] Patent Number: 5,276,469

[45] Date of Patent: Jan. 4, 1994

Beaufort et al.

[54] ROTATABLE PRINT CARTRIDGE AND METHOD OF OPERATION FOR TRANSPORTING PRINT MEDIA WITHIN AN ELECTROPHOTGRAPHIC PRINTER

[75] Inventors: Richard Beaufort; Harold B. Noyes, both of Boise, Id.

[73] Assignee: Hewlett-Packard Company, Palo Alto, Calif.

[21] Appl. No.: 910,852

[22] Filed: Jul. 6, 1992

[51] Int. Cl.[5] ........................ G01D 15/06; G03G 5/00; G03G 21/00

[52] U.S. Cl. ................................ 346/153.1; 355/211; 355/309

[58] Field of Search ........................ 355/210, 211, 309; 346/153.1

[56] References Cited

U.S. PATENT DOCUMENTS 3,574,455 4/1971 Mix, Jr. et al. .................... 355/211
4,456,363 6/1984 Hirabayashi ........................ 355/309
4,987,446 1/1991 Mochimaru et al. ............... 355/210

*Primary Examiner*—George H. Miller, Jr.

[57] ABSTRACT

A new and improved electrophotographic printer and method of operation wherein a disposable print cartridge is rotatably mounted within the printer housing and is operative to directly drive paper out of a paper stack within a paper cassette in the housing and into the active print area therein between the surface of a photoconductive drum and an adjacent transfer roller. The rotatable disposable print cartridge is constructed to include a plurality of paper pick up strips and idler rollers uniformly spaced at predetermined locations along the surface of the disposable print cartridge and operative to be directly driven into contact with paper during the paper pick transport and print modes of the printer. In the non-print mode and in preparation for picking and printing the next sheet, the disposable print cartridge is rotated clockwise while the stack of paper drops away from the cartridge surface to avoid contact with the print cartridge at this time. In the subsequent paper pick and print mode, the print cartridge is rotated in a counter-clockwise direction down into direct contact with the top sheet of paper in the rising paper stack in the input paper cassette for driving it into the print area. During this later motion, a drive roller operates against the paper surface to drive the paper between the photoconductive drum and an adjacent transfer roller for printing an image on the paper. Advantageously, the above print cartridge rotational motion eliminates the need for dry powder toner stirrers as well as paper pick rollers.

20 Claims, 7 Drawing Sheets

ROTATABLE PRINT CARTRIDGE AND METHOD OF OPERATION FOR TRANSPORTING PRINT MEDIA WITHIN AN ELECTROPHOTGRAPHIC PRINTER

TECHNICAL FIELD

This invention relates generally to electrophotographic or laser printers and more particularly to a multi-purpose rotatable print cartridge for picking paper out of an input paper cassette for such printers.

BACKGROUND ART

In the construction and design of certain types of electrophotographic printers, such as Hewlett Packard's widely acclaimed series of LaserJet TM printers, it has been a common practice to use a fixedly mounted disposable print cartridge adjacent to the paper path within the printer housing, and load paper into a paper cassette which is located a certain distance beneath the print cartridge. This design constraint is present in order to allow a D-shaped pick roller to be operated between a stack of paper within the paper cassette and a paper guide for passing the paper to the print area of the print cartridge. During this operation, the D-shaped pick roller rotates to drive the top sheet of paper within the paper stack between a photoconductive drum of the print cartridge and an adjacent transfer roller, as is well known in the electrophotographic printing arts.

Whereas the above paper transport mechanism operates highly satisfactorily in many respects, there are certain disadvantages associated with the cost, maintenance, and space requirements occasioned by the use of the D-shaped pick roller. It is the elimination of these disadvantages to which the present invention is directed.

DISCLOSURE OF INVENTION

In accordance with the present invention, it has been discovered that the D-shaped pick roller of the prior art electrophotographic printers using disposable print cartridges can be completely eliminated and replaced by the use of a rotatable print cartridge having a plurality of rubber strips and idler rollers mounted at spaced locations thereon. The print cartridge is operative to receive controlled relative motion with respect to the stack of paper within the input paper cassette of the printer and be rotatably driven into contact with the top sheet of the paper stack. During this operation, the rubber strips and idler rollers drive each successive sheet of paper by way of an adjacent drive roller and paper guide member into contact with the photoconductive drum of the print cartridge. In this manner, the print cartridge can be compactly mounted directly adjacent to the surface of the input paper cassette to thereby make possible a significant size reduction for the printer housing.

Accordingly, it is an object of the present invention to provide a new and improved electrophotographic printer of the type described which represents a fundamental structural departure from prior art electrophotographic type printers using D-shaped pick rollers or the like.

Another object of this invention is to provide a new and improved electrophotographic printer of the type described which represents a fundamental breakthrough in the art of electrophotographic color printing and completely eliminates the D-shaped pick roller along with its associated disadvantages of cost, maintenance and dedicated space required within the printer housing.

Another object of this invention is to provide a new and improved electrophotographic printer of the type described which effectuates a significant increase in the maximum achievable packing density for all of the components within the electrophotographic printer housing.

Another object of this invention is to provide a new and improved electrophotographic printer of the type described which operates to eliminate the requirement for stirrers within the toner compartments of the printer housing.

Another object of this invention is to provide a new and improved electrophotographic printer of the type described wherein the paper pick members, including the rubber strips and idler rollers, may be replaced each time the disposable print cartridge is replaced, thereby maintaining wear uniformity of the various components associated with paper transport within the printer housing.

To achieve the above objects, the disposable print cartridge disclosed and claimed herein is mounted directly adjacent to the paper cassette within the printer housing and is initially rotatably driven in a clockwise direction up and away from the paper stack in the non-print mode. Then, in its paper transport and print mode, the print cartridge is driven in a counterclockwise direction and down into direct contact with the paper stack where the rubber strips and idler rollers operate to drive the top sheet of paper from the paper stack between an external drive roller and the surface of the disposable print cartridge and then into the print area of the printer. During this rotational motion of the print cartridge, the photoconductive drum therein is rotated upwardly into a position where an image is written thereon by a laser beam. Then the photoconductive drum is moved into abutting contact with an adjacent transfer roller and between which the paper passes in order to transfer the written image from the photoconductive drum to the paper.

In an alternative embodiment of the present invention, the print cartridge may be initially moved vertically out of contact with the paper cassette after each printing operation and then retracted laterally with respect to the plane of the paper before being rotatably driven into frictional contact with the paper stack. This operation serves to precisely position the rubber strips and idler rollers at a desired contact location on the top sheet of paper within the stack.

A novel feature of this invention resides generally in a method of paper pick operation for transporting paper from a paper cassette within a printer housing to a given print area therein. This method includes rotating a disposable print cartridge in the printer housing into direct frictional contact with a stack of paper therein and thereby driving a top sheet of paper in the stack toward and then into the print area of the printer. The printed paper is then guided through a fuser apparatus and then into an output paper tray.

Another feature of this invention is its ability to be used with corner separators at each corner of the paper tray in place of the rubber strips and idler rollers in order to ensure that only the top sheet of paper in the stack be removed during a printing operation.

Another feature of this invention resides in the elimination of toner stirrers inasmuch as the rotation of the print cartridge inherently provides sufficient toner stirring and good mixing of toner powders during the oscillatory motion thereof.

The above brief summary of invention, together with its attendant objects, advantages and novel features will become better understood with reference to the following description of the accompanying drawings.

DETAILED DESCRIPTION OF THE DRAWINGS

Figure 1:
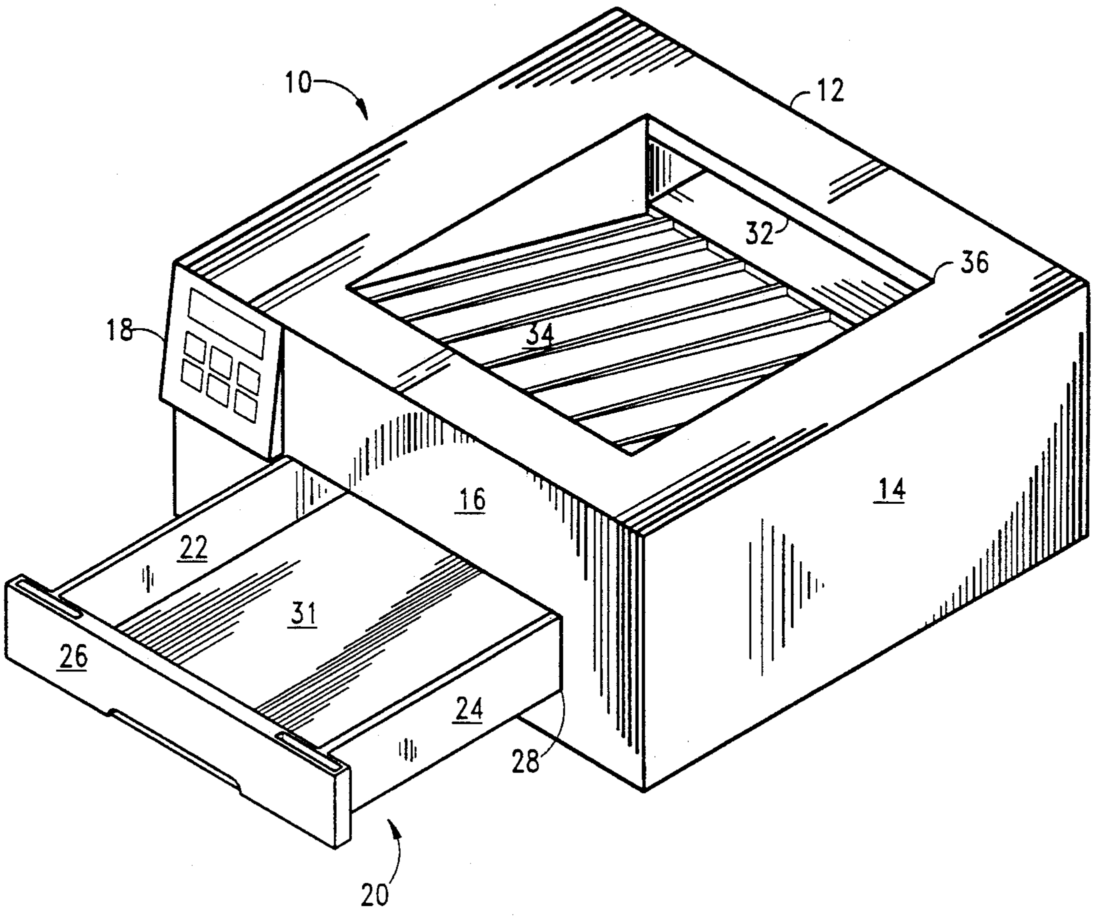
FIG. 1 is a perspective view showing the outer housing of a typical electrophotographic printer and the relative positions of the input paper cassette and the output paper tray.

Referring now to FIG. 1, there is shown in perspective view an electrophotographic or laser printer designated generally as 10 and including a main printer housing having a top wall 12, side walls 14, and a front wall 16 with a display panel 18 located on one side thereof in the well known Hewlett Packard LaserJet TM printer design. The printer further includes an input paper cassette 20 having upstanding side walls 22 and 24 and a front wall 26 adapted for insertion into a mating opening 28 in the front wall 16 of the laser printer 10. The input paper cassette 20 contains a stack 30 of paper with a top sheet 31 thereof as viewed in FIG. 1, and the printed paper exits the electrophotographic printer 10 by way of a paper exit port 32 before entering an output paper tray 34. The output paper tray 34 is slanted at a slight angle with respect to horizontal as shown and is aligned with the rectangular opening 36 in the top wall 12 of the printer housing 10.

Figure 2:
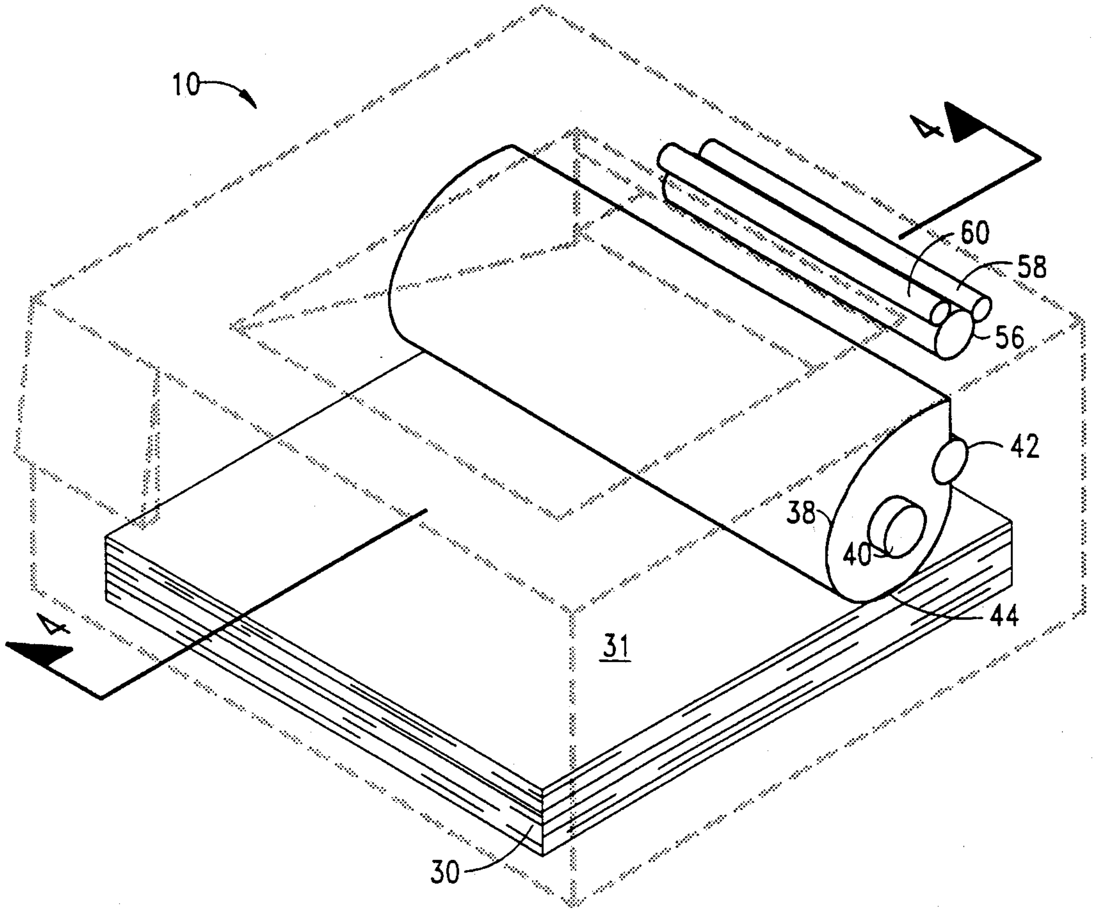
FIG. 2 is a perspective view showing the location of a disposable print cartridge operative in accordance with the present invention and located within the printer housing. This figure shows the cartridge position with respect to the location of the stack of paper and fuser rollers therein.

Referring now to FIG. 2, the laser printer 10 is shown with its outer housing represented by dotted lines so as to reveal the exact position of a rotatable disposable print cartridge 38 within which includes a rotatably driven axial cylinder 40 and at whose outer surface is positioned a photoconductive drum 42. The rotation and operation of the photoconductive drum 42 are well known in the art and are therefore not described in detail herein. In the perspective view shown in FIG. 2, the input paper cassette 20 has been fully inserted into the printer housing 10 and the top sheet 31 of the stack 30 of paper therein is positioned in closely adjacent or touching relationship to the disposable print cartridge 38 at the paper pick area indicated at region 44. As described in more detail below with respect to FIG. 3, the print cartridge 38 further includes a plurality of symmetrically spaced rubber strips 46, 48, and 50 between which are located a plurality of idler rollers 52 and 54 positioned in the paper pick preparation mode.

The printed paper 31 leaving the print area within the printer housing 10 and described in some detail in the text that follows will be guided into contact with a fuser roller 56 and first upwardly between the fuser roller 56 and a first idler or pressure roller 58. Then, the paper 31 takes a 90° turn and moves between the fuser roller 56 and a second pressure or idler roller 60 before being passed horizontally into the output paper tray 34 shown in FIG. 1.

Figure 3:
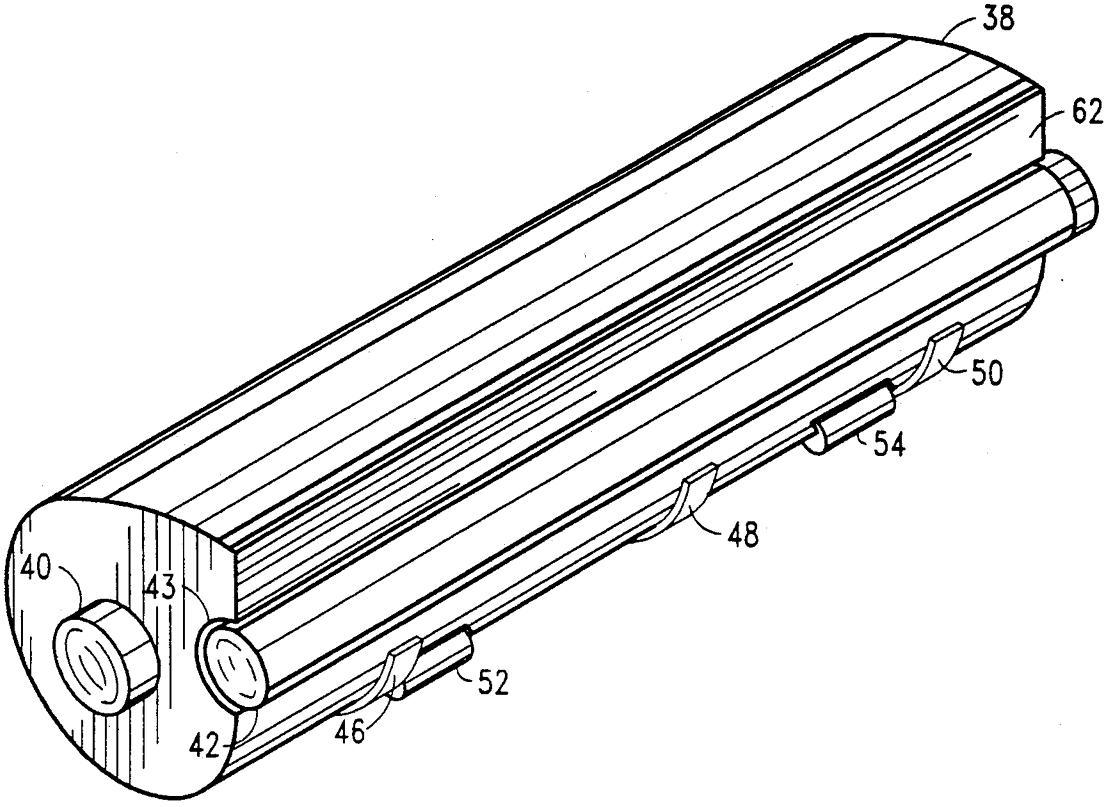
FIG. 3 is an enlarged perspective view showing the rotatable print cartridge constructed in accordance with a preferred embodiment of the invention.

Referring now to the enlarged perspective view in FIG. 3 showing the disposable print cartridge 38, it is seen that the photoconductive drum 42 is positioned along the front facing surface 62 and adjacent to the upper edges of the rubber strips 46, 48, and 50. Thus, in operation, when the print cartridge 38 shown in FIG. 3 is rotated in its print mode in a counterclockwise direction, the rubbers strips 46, 48, and 50 and idler rollers 52 and 54 are driven into direct frictional contact with the top sheet of paper 31 in the paper stack 30. Thereafter, the top sheet of paper 31 in the stack 30 is guided by a paper guide member described in detail below and between the outer surface of the photoconductive drum 42 and an adjacent transfer roller where images are transferred in the print area from the surface of the photoconductive drum 42 and onto the printed media 31. The print media 31 then continues to pass between the surface of the photoconductive drum 42 and an adjacent transfer roller and then between the fuser roller 56 and the idler rollers 58 and 60 previously described above with reference to FIG. 2.

As will be seen in the remaining figures, the photoconductive drum 42 remains physically separated at all times from the print cartridge housing 62 by the gap 43 and is independently rotatable about its own central axis of rotation during the writing of latent images thereon with a laser beam. Similarly, the cartridge 38 is independently rotatable about its central axis 40 during the complete cycle of paper pick and transfer as described below. During this cycle, the oscillatory motion of the cartridge housing 38 provides all the necessary stirring for dry toner powders within the housing 38, so that separate toner stirrers have been completely eliminated in accordance with the novel teachings herein.

Figure 4:
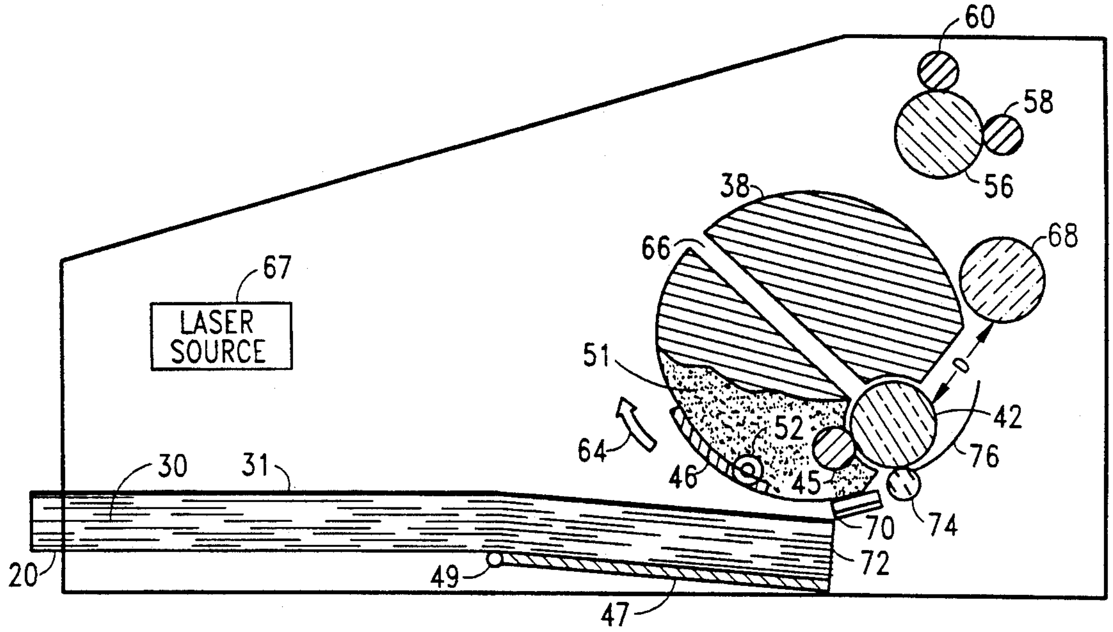
FIG. 4 is a cross sectional elevational view taken along lines 4—4 of FIG. 2 showing the position and clockwise rotation of the print cartridge as it is just beginning to enter the paper transport and print cycle.

Referring now to FIG. 4, to initiate a paper pick operation, the print cartridge 38 is initially rotated clockwise in the direction of the arrow 64 so as to rotate and retract the rubber strips 46 and idler roller 52 to the position shown in FIG. 4 in preparation for a paper pick and print mode of operation. In this position, the laser beam passageway 66 is rotated clockwise to an angle of about 45° with respect to horizontal, and the photoconductive drum 42 is simultaneously removed a distance "D" away from a transfer roller 68 which subsequently is to receive the media to be printed. This clockwise rotation of the print cartridge 38 simultaneously retracts the left hand edge of a first media guide member 70 (which is attached to the print cartridge 38) to approximately the six o'clock position and in the position shown in FIG. 4.

During this clockwise retractive motion of the print cartridge 38, the paper stack 30 is lowered to the position shown so that the top sheet 31 of paper in the stack 30 is significantly removed from the surface of the print cartridge 38. This motion is accomplished by mechanically rotating a lift plate 47 beneath the paper 20 in a clockwise direction and about a pivotal axis of rotation 49. Also during this time, a developer roller 45 will rotate through the surrounding toner 51 and against the surface of the photoconductive drum 42 to dispense a thin film of toner on the outer surface of the photoconductive drum 42 in a well known manner. By this and subsequent rotational motions of the cartridge 38, no toner stirrers are required. As will be seen below, the first paper guide 70 will next operate to guide the top sheet 31 of paper picked from the stack 30 in the cassette 20 to the intersection of a drive roller 74 and the idler roller 52.

Figure 5:
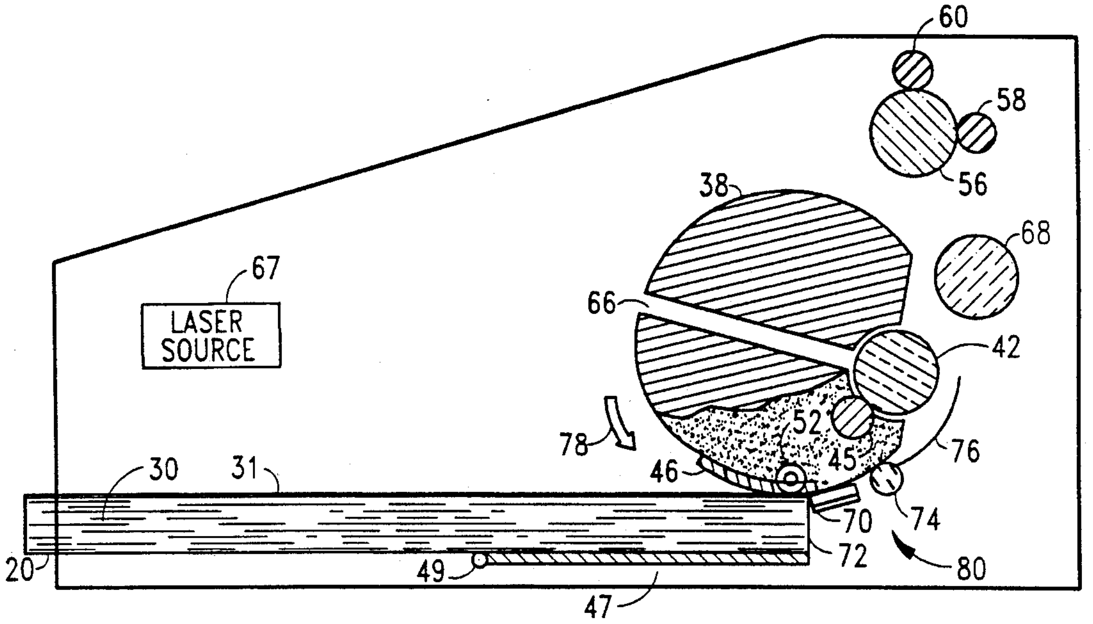
FIG. 5 is a cross sectional elevational view in the same plane as FIG. 4, with the print cartridge now being rotated counter-clockwise to begin its paper pick motion in the input paper cassette.

Referring now to FIG. 5, the print cartridge 38 is now rotated in a counterclockwise direction as indicated by the arrow 78. During this motion, the rubber strips 46 and idler rollers 52 are driven into direct contact with the upper sheet of paper 31 within the paper stack 30 at approximately the six o'clock position for the rubber strips 46 and the idler rollers 52. Also during this motion, the paper stack 30 is raised by the lift plate 47 to the position shown in FIG. 5, and thereafter the top sheet of paper 31 in the stack 30 is driven by the rubber strips 46 and idler rollers 52 and into the paper guide 70 and toward the drive roller 74. Subsequently, the paper drive roller 74 will take over and continue to drive the paper 31 along the surface of the paper guide member 76 and toward the stationary transfer roller 68. This paper drive control and motion are carried out in such a manner as to ensure that the paper 31 is precisely guided into the print area between the photoconductive drum 42 and the transfer roller 68.

Figure 6:
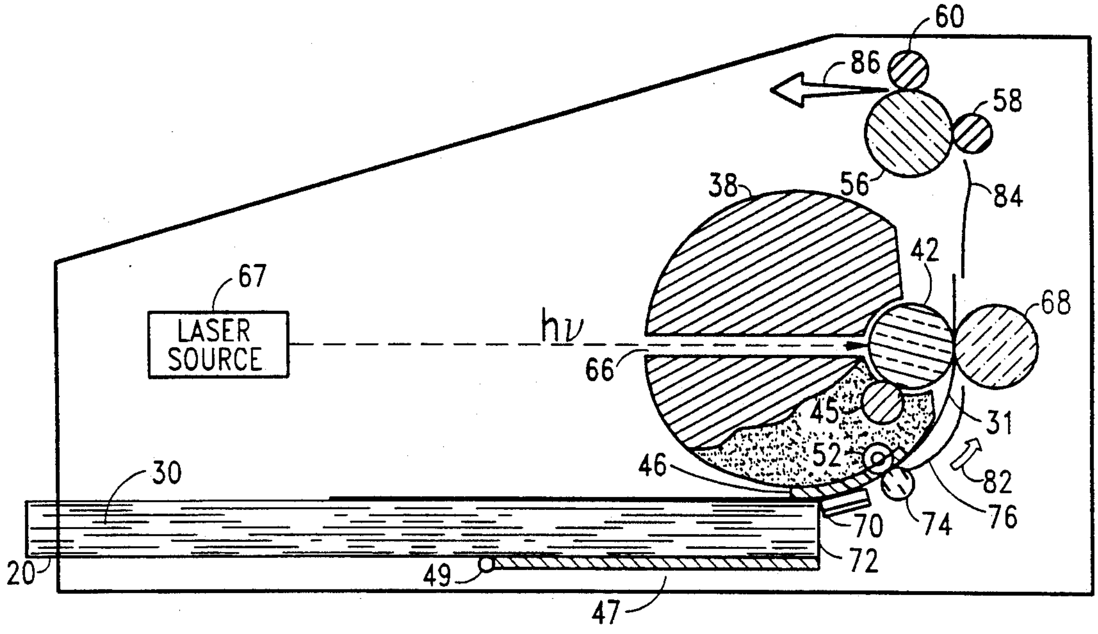
FIG. 6 is a cross sectional elevational view showing the continued counter-clockwise rotation of the print cartridge as it drives the top sheet of paper in the input paper cassette into the print area of the electrophotographic printer and between the photoconductive drum and transfer roller thereof. In this figure, the photoconductive drum is rotated 360° several times during which time and motion a latent image is written thereon by a laser source.

Next, as shown in the cross sectional view of FIG. 6, the print cartridge 38 continues its rotation in the counterclockwise direction as indicated by the arrow 82 so as to make two critical and important movements. The first of these movements is to bring the drive roller 74 into direct contact with the idler roller 52 and thereby enable the top sheet of paper 31 from the stack 30 to be continuously driven into the print area between the photoconductive drum 42 and the transfer roller 68. Secondly, the laser passageway 66 of the print cartridge 38 is rotated to the nine o'clock position shown so as to align the passageway 66 with the laser source 67. In this manner, the laser source 67 can write the latent image on the photoconductive drum 42 while the drum 42 rotates 360° about its own central axis of rotation a number of times. This is done while the drum 42 and the transfer roller 68 are in direct contact with each other and while the paper 31 is receiving the printed image from the photoconductive drum 42. Also during this latter movement, the transfer roller 68 will physically engage the photoconductive drum 42 at the same time that the idler roller 52 engages the drive roller 74. This position will then be maintained until a printed sheet 31 is driven through the fuser apparatus 56, 58, and 60 into an output tray 34, and until the retractive motion shown in FIG. 4 is again initiated.

Figure 7:
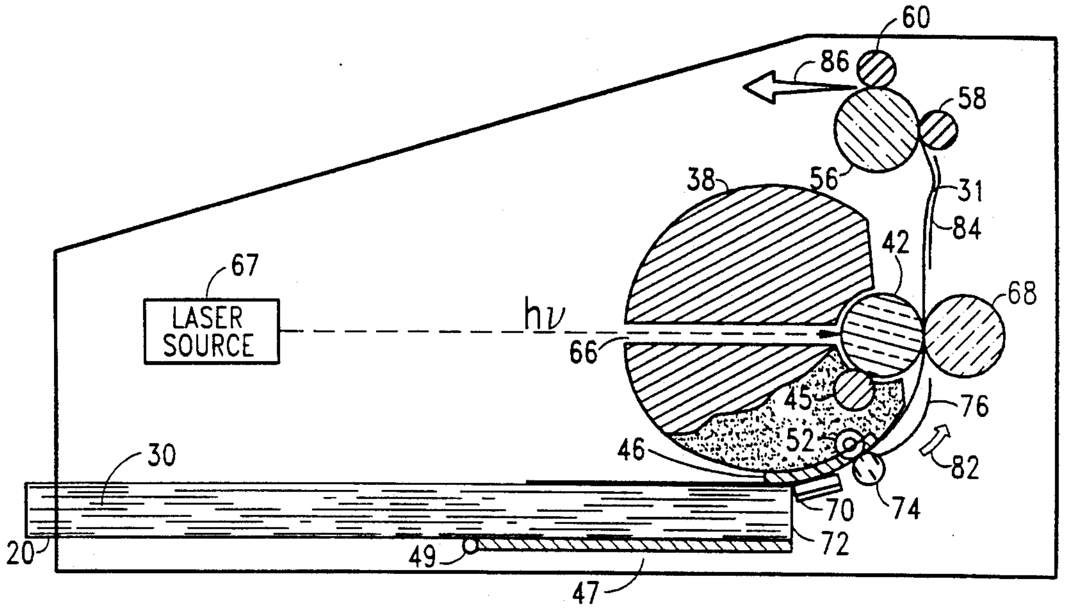
FIG. 7 is a cross section view taken in the same plane as FIG. 6 and shows the paper being driven between the photoconductive drum and transfer roller to transfer the image to the paper. This figure further shows the continued drive of the printed paper to the location of the fuser rollers and then toward an output paper collection tray.

Referring now to FIG. 7, the photoconductive drum 42 and the transfer roller 68 continue to be driven in opposite rotational directions to thereby print the complete image on the surface of the paper 31 and thereafter pass the paper 31 along the surface of a third paper guide member 84. Then, as previously indicated, the paper 31 is passed between the first and second idler rollers 58 and 60 and the adjacent fuser roller 56. Finally, the printed paper 31 is passed from the intersection of the second idler roller 60 and the fuser roller 56 and in the direction of the arrow 86 toward and into the output paper tray 34 shown in FIG. 1.

For a further detailed description of the specific and novel operation of the fuser roller 56 and the two idler or pressure rollers 58 and 60, reference may be made to copending application Ser. No. 07/758,011 of Richard F. Beaufort et al, filed Sep. 12, 1991, and entitled "Improved Fuser Method and Apparatus For Reducing Media Curl In Electrophotographic Printers". This Beaufort et al application is assigned the present assignee and is incorporated fully herein by reference.

Various modifications may be made in and to the above described embodiments without departing from the spirit and scope of this invention. For example, various mechanical design modifications may be made in the above described embodiments while still utilizing the method and apparatus for rotating a disposable print cartridge and employing the cartridge as a paper pick mechanism in order to eliminate the prior art D-shaped pick rollers and the various disadvantages associated therewith. In addition, the disposable print cartridge described herein may be used with electrostatic toner projection units instead of contact developer rollers 45 of the type described and may also be used with color toner projection units as well as black and white toner projection units. Accordingly, these and other materials and design modifications are clearly within the scope of the following appended claims.

We claim:

1. Printing apparatus including a disposable print cartridge for an electrophotographic printer including, in combination:

a. means for rotating said print cartridge about a central axis of rotation, b. a stack of paper adjacent the print cartridge, and c. idler rollers and paper pick up strips mounted at spaced locations at the outer surface of said print cartridge for frictionally driving a top sheet of paper from said stack of paper into the into the print area of said printer.

2. The apparatus defined in claim 1 which includes means for operatively driving said print cartridge away from the surface of a top sheet of paper within a paper stack during the non-print mode of said electrophotographic printer and then subsequently driving said print cartridge down into frictional contact with said top sheet of paper during the paper transport and print modes for said printer.

3. The apparatus defined in claim 2 wherein a paper drive roller is positioned between a transfer roller and said stack of paper and operative to receive said top sheet of paper and drive it between said transfer roller and a photoconductive drum within said print cartridge as said photoconductive drum of said print cartridge is rotated into contact with said transfer roller.

4. The apparatus defined in claim 3 which further includes a first paper guide member positioned between said stack of paper and said drive roller and a second paper guide member positioned between said drive roller and said transfer roller.

5. A rotatable print cartridge including paper drive means on an outer surface thereof for driving print media from a paper cassette, and means for rotating said print cartridge so that said paper drive means is driven in frictional engagement with said print media to move said print media into a given print area.

6. The print cartridge defined in claim 5 which includes means for rotating said print cartridge TM about a central axis of rotation.

7. The print cartridge defined in claim 6 wherein said paper drive means includes idler rollers and paper pick up strips mounted at said outer surface of said print cartridge.

8. The print cartridge defined in claim 7 which includes means for operatively driving said print cartridge away from the surface of a top sheet of paper within a paper stack during the non-print mode of said electrophoto-graphic printer and then subsequently driving said print cartridge down into frictional contact with said top sheet of paper during the paper transport and print modes for said printer.

9. The apparatus defined in claim 8 wherein a paper drive roller is positioned between a transfer roller and said stack of paper and operative to receive said top sheet of paper and drive it between said transfer roller and a photoconductive drum within said print cartridge after said photoconductive drum of said print cartridge is rotated into contact with said transfer roller.

10. The apparatus defined in claim 9 which further includes a first paper guide member positioned between said stack of paper and said drive roller and a second paperguide member positioned between said drive roller and said transfer roller.

11. An electrophotographic printer including a rotatable disposable print cartridge mounted for rotational paper pick drive directly adjacent to a paper filled cassette, and said cartridge being operatively driven to transport a top sheet of paper within said cassette to a given print area.

12. The printer defined in claim 11 which includes means for operatively driving said rotatable print cartridge away from the surface of a top sheet of paper within a paper stack during the non-print mode of said electrophotographic printer and then subsequently driving said rotatable print cartridge down into frictional contact with said top sheet of paper during the paper transport and print modes for said printer.

13. The printer defined in claim 12 wherein said disposable print cartridge includes paper drive means on the surface thereof for driving print media into a given print area.

14. The printer defined in claim 13 which includes means for rotating said cartridge about a central axis of rotation.

15. The printer defined in claim 14 wherein said paper drive means includes idler rollers and paper pick up strips mounted at the outer surface of said print cartridge.

16. The printer defined in claim 15 wherein a paper drive roller is positioned between a transfer roller and said stack of paper and operative to receive said top sheet of paper and drive it between said transfer roller and a photoconductive drum within said print cartridge after said photoconductive drum of said print cartridge is rotated into contact with said transfer member.

17. The printer defined in claim 16 which further includes a first paper guide member positioned between said stack of paper and said stack of paper and said drive roller and a second paper guide member positioned between said drive roller and said transfer roller.

18. A method for transporting paper from a paper cassette within a printer housing to a given print area therein which includes:

a. rotating a disposable print cartridge in said housing into direct frictional contact with a stack of paper therein, and thereby b. driving a top sheet of paper in said stack toward and then into said given print area.

19. The method defined in claim 18 which includes initially rotating said print cartridge in a clockwise direction in the paper pick preparation mode and thereafter rotating said print cartridge in a counter-clockwise direction in the paper pick mode wherein the top sheet of paper in said paper stack is driven toward said print area of said printer.

20. The method defined in claim 18 which includes raising and lowering said paper stack out of and into paper pick contact with said paper drive means during the transport of each successive sheet of paper to said print area.

* * * * *